(No Model.)
W. S. HAINES.
PIPE COUPLING.
No. 548,610. Patented Oct. 22, 1895.
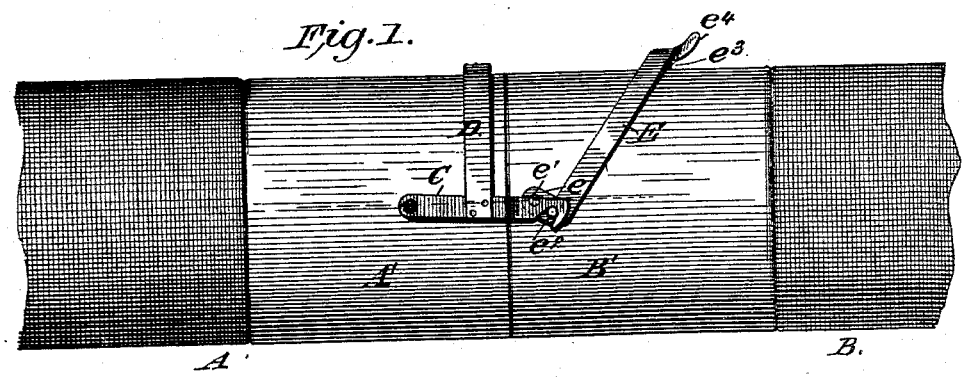
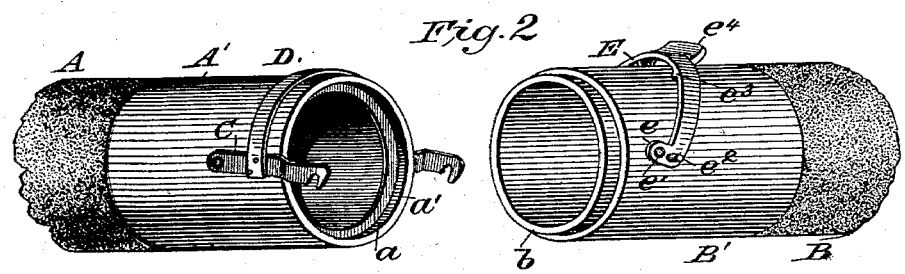
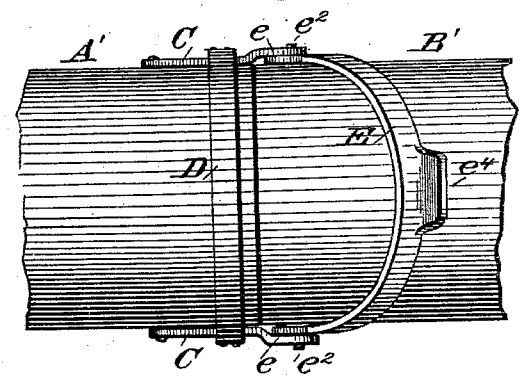
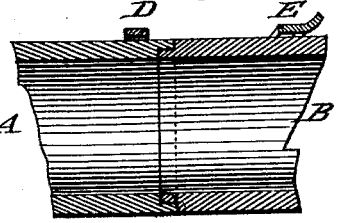
WITNESSES:
Jas. L. Crawford.
W. W. Nesbit
INVENTOR
W. S. Haines
BY
John M. O'Meara
ATTORNEY.

UNITED STATES PATENT OFFICE.

WINFIELD S. HAINES, OF NORTH WALES, ASSIGNOR OF ONE-HALF TO L. D. HANDY, OF AMBLER, PENNSYLVANIA.

PIPE-COUPLING.

SPECIFICATION forming part of Letters Patent No. 548,610, dated October 22, 1895.

Application filed January 28, 1895. Serial No. 536,508. (No model.)

*To all whom it may concern:*

Be it known that I, WINFIELD S. HAINES, residing at North Wales, in the county of Montgomery and State of Pennsylvania, have invented a new and Improved Pipe-Coupling, of which the following is a specification.

My invention has for its object to provide a simple, inexpensive, and quickly and easily operated coupling device for fire or other hose. It has also for its object to provide a device of this character which when adjusted in a coupled position will be held locked automatically.

To these ends my invention consists in a hose-coupling device constructed and arranged in the manner hereinafter first described in detail and then specifically pointed out in the appended claim, reference being had to the accompanying drawings, in which—

Figure 1 is a side elevation of the ends of two hose-sections, showing my coupling devices in their locked position. Fig. 2 is a perspective view of the ends of the two sections equipped with my improved coupling devices detached. Fig. 3 is a plan view of the parts shown in Fig. 1, and Fig. 4 is a view of a modified arrangement hereinafter referred to.

Referring to the accompanying drawings, A and B indicate the two hose-sections, which have their ends provided with metallic coupling portions A' and B', as shown, one of which A' is formed with an internal annular seat $a$, while the other is formed with a corresponding external seat portion $b$, the two forming, as it were, a tongue-and-groove connection when the two sections are joined together, and to form a close joint the seat $a$ is preferably provided with an elastic gasket or packing-ring $a'$, as shown. While I have shown the ends of the base-sections formed with supplemental metallic portions A' B', it is manifest that they may be omitted and the ends of the hose-body proper formed with the internal and external portions $a$ and $b$. In the latter construction, however, the ring $a'$ is not required. (See Fig. 4.)

Upon one of the hose-sections, preferably A', is pivoted a pair of coupling-hooks C C, which are fixedly connected to a saddle member D, the purpose of which is to hold the hooks normally to an approximately-horizontal position and ready for coupling, such saddle, however, being of such a size as to permit the outer or coupling ends of such hooks to drop to a position slightly below the horizontal axis, for a purpose presently explained.

E indicates what I term the "coupling-lever," which is in the nature of a yoke member having its side arms inclined rearward, as most clearly shown in Fig. 1, and such side arms terminate in crank-like portions $e\ e$, which are pivoted on the line of the horizontal axis of the pipe-section B, as at $e'$, and such crank portions have each a laterally-extended stud $e^2$. The upper or curved portion of the lever E has lugs $e^3$ and a central upwardly-projecting finger portion $e^4$, the purpose of the lugs $e^3$ being to keep the finger portion $e^4$ projected above the pipe when the lever is to its locked position.

From the above description, taken in connection with the drawings, it will be seen that when the ends of the pipe-sections are fitted together and the hooks slipped over the studs on the lever E so soon as the lever is swung down to the position shown in full lines in Fig. 1 the studs $e^2$ will pass below the horizontal axis and carry with them the ends of the hooks, which, owing to the elastic or yielding connection of the pipe-sections, serve to pull in a line below the pivot-points of the lever, and thereby automatically hold the coupling members to their locked position.

To uncouple the pipe-sections the lever E is grasped by the finger-piece and swung upward, as indicated in dotted lines in Fig. 1, to bring the studs above and slightly forward of the pivot-points of the lever, where in this position the hooks can be readily disengaged from the studs. By arranging the lever and hook devices as shown the coupling operation can be quickly effected. Such coupling means will be found very useful for fire-hose, as the fireman can easily couple or uncouple the parts, even in very cold weather, as the finger-piece at all times is in a proper position to be manipulated. By connecting the hooks by a saddle member they will always be in a position for coupling.

Having thus described my invention, what I claim, and desire to secure by Letters Patent, is—

As an improvement in hose couplings the combination with the section A, having hook members C pivoted thereto and projected beyond the end thereof, and a saddle member D fixedly secured at the ends to the hooks and adapted to rest on the section A when such hooks are in an uncoupled position, of the section B, having a yoke like lever, said lever having crank portions $e$ pivoted to the section A on the line of its horizontal axis, said crank portion having lateral stud members $e^2$, the said lever having lugs $e^3$ adapted to hold the upper edge of the lever free from the pipe section, said edge having a finger portion $e^4$ all arranged substantially as shown and for the purposes described.

In testimony whereof I affix my signature in presence of two witnesses.

WINFIELD S. HAINES.

Witnesses:
L. D. HANDY,
I. W. WAMPOLE.